(12) United States Patent
Bohossian et al.

(10) Patent No.: US 7,319,661 B1
(45) Date of Patent: Jan. 15, 2008

(54) HIGH AVAILABILITY COMMUNICATION FOR WIRELESS NETWORKS

(75) Inventors: Vasken Bohossian, Pasadena, CA (US); Meina Xu, Pasadena, CA (US)

(73) Assignee: EMC Corporation, Hopkinton, MA (US)

( * ) Notice: Subject to any disclaimer, the term of this patent is extended or adjusted under 35 U.S.C. 154(b) by 1097 days.

(21) Appl. No.: 10/132,434

(22) Filed: Apr. 23, 2002

Related U.S. Application Data

(60) Provisional application No. 60/285,902, filed on Apr. 23, 2001.

(51) Int. Cl.
*H04L 12/26* (2006.01)
(52) U.S. Cl. ........................ 370/216; 370/252
(58) Field of Classification Search ...................... None
See application file for complete search history.

(56) References Cited

U.S. PATENT DOCUMENTS

| | | | | |
|---|---|---|---|---|
| 5,768,527 | A * | 6/1998 | Zhu et al. | 709/231 |
| 5,995,830 | A | 11/1999 | Amin et al. | 455/423 |
| 2002/0133514 | A1 * | 9/2002 | Bates et al. | 707/501.1 |
| 2003/0147369 | A1 * | 8/2003 | Singh et al. | 370/338 |

OTHER PUBLICATIONS

Gibson et al., "Network Attached Storage Architecture," *Communications of the ACM*, Nov. 2000/vol. 43, No. 11 p. 37-46.

Goldworm, B. "The Difference Between SANs and NAS" Network World Storage in the Enterprise Newsletter, Oct. 2, 2000, http://nwfusion.com/newsletters/sor/2000/1002stor1.html, 3 pages.
Graz, "Network Attached Storage: An Overview" SQLTeam.com: Your SQL Server Home on the Web, Jul. 11, 2000, http://www.sqlteam.com/ItemPrint.asp?ItemID=134, 2 pages.
Hesselink, "Ultra-High-Density Data Storage," Communications of the ACM, Nov. 2000/vol. 43, No. 11 p. 33-36.
Openwave Systems Inc. UP.SDK Developer's Guide, UP.SDK Release 4.1, Copyright 1994-2000. 156 pages.
Syred Data Systems, Next Generation Storage and Virtualization Solutions, FAQ Network Attached Storage (NAS) http://www.syred.com/FAQ-NAS.html, 5 pages.
WAP PPG Service Version Aug. 16, 1999, Wireless Application Protocol Push Proxy Gateway Service Specification, *Wireless Application Protocol Forum, Ltd.* 20 pages (1999).

(Continued)

*Primary Examiner*—Duc Ho
(74) *Attorney, Agent, or Firm*—Barry N. Young

(57) ABSTRACT

During an exchange of communications between a client and a server, the state of communications is monitored to determine if the client has lost communication with the server prior to completion of the exchange. If a loss of communication is detected, a recovery message is transmitted to the client, wherein the recovery message is received by the client after client communications with the network are re-established. The recovery message causes the client to send a response message to a predetermined network location. Receipt of the response message is an indication that the client has re-established communication. In such a case, the exchange is returned to a state that existed prior to the loss of communication.

29 Claims, 8 Drawing Sheets

OTHER PUBLICATIONS

WAP Push Access Protocol Version Nov. 8, 1999, Wireless Application Protocol Push Access Protocol Specification, *Wireless Application Protocol Forum, Ltd.* 44 pages (1999).

WAP Push Architectural Overview Version Nov. 8, 1999, Wireless Application Protocol Push Architectural Overview, *Wireless Application Protocol Forum, Ltd.* 26 pages (1999).

WAP Push Message Version Aug. 16, 1999, Wireless Application Protocol Push Message Specification, *Wireless Application Protocol Forum, Ltd.* 13 pages (1999).

WAP Push OTA Protocol WAP-189-PushOTA Version Feb. 17, 2000, Wireless Application Protocol Push OTA Protocol Specification, *Wireless Application Protocol Forum, Ltd.* 20 pages (2000).

\* cited by examiner

1. Client Requests page A
2. Page A sent to client.
3. Client loses connection.
4. Recovery agent activates PI.
5. PI pushes URL to client.
6. Client regains communication.
7. Client requests URL.
8. Recovery agent stops PI.
9. Cause server to send Web page.

HIGH AVAILABILITY COMMUNICATION FOR WIRELESS NETWORKS

REFERENCE TO PRIORITY DOCUMENT

This application claims priority of U.S. Provisional Patent Application Ser. No. 60/285,902 entitled "High Availability Communication for Wireless Networks" by V. Bohossian et al., filed Apr. 23, 2001. Priority of the filing date of Apr. 23, 2001 is hereby claimed, and the disclosure of the Provisional Patent Application is hereby incorporated by reference.

BACKGROUND OF THE INVENTION

1. Field of the Invention

The invention relates to processing network messages between a network client and a network server. In particular, the invention relates to recovering from the loss of communication between a wireless client and server.

2. Description of the Related Art

Consumer desire for access to information, such as voice and data, is continually increasing. More recently, consumers are becoming mobile, moving about from one location to another and still wanting access to information. Devices that allow customers to access information while the customers are mobile are continuing to be developed. Mobile devices are placing increased demands on communication systems, in particular wireless communication systems.

Modern wireless communication systems are generally highly reliable and effective in transferring signals, such as voice or data, between multiple devices. A communications link is established between at least two devices and then the transfer of signals can occur. However, there are occasions when the established communication between devices can be prematurely interrupted, or "dropped", resulting in the devices no longer being in communication with each other. Interruptions in communications are more prevalent in wireless communication systems than in a wired communication system, due in part to the physical connection between devices in the wired communication system being more stable, while there is no such physical connection in a wireless communication system.

In a wireless telecommunication system, for example, a cellular system, established communications might be dropped for a number of reasons. One reason for dropped communications is that a wireless device has left the coverage area of the local wireless system and is not picked up or transferred to a new system. For example, a cellular telephone system is typically divided into geographic cells, each of which is served by a base station which communicates with wireless devices located within the cell. All the cells together make up the coverage area of the cellular system. As the mobile device travels from cell to cell of the coverage area, the base stations transfer the device to a succeeding communications channel, maintaining the established communication.

If a mobile device travels outside the system coverage area, the wireless communication channel between the mobile device and the wireless system will be lost and the communication will be dropped. In some situations the mobile device can be entering the coverage area of a second cellular service provider. In this situation, the communication can continue with the mobile device in the other cellular system, if the second cellular service supports such communication.

Another reason that an established communication might be dropped in a cellular system is due to a failed handoff. For example, if a mobile telephone travels from a first cell to a second cell in the cellular system, the communication is handed off from a base station serving the first cell to a base station serving the second cell. In some situations the base station serving the second cell might not have any radio channels available for communication with the mobile device at the time of the handoff. In such a situation the established communication with the mobile device will be dropped. Another reason for dropped communications in a cellular system is referred to as coverage holes, which are areas in the geographic serving area which do not receive signals from the system. If a mobile device enters a coverage hole, communication with the serving base station will be lost and the communication will be dropped. Communication in a cellular system can also be dropped due to RF interference and equipment failures.

Dropped communication are very inconvenient to consumers. Re-establishment of the communication is left to the parties to the communication. This re-establishment can be somewhat difficult, especially where neither party knows the intention of the other party. For example, if the communication is a call between cell phones, both parties might attempt to call the other party, which can result in both parties receiving a "busy signal" and the connection being blocked. Alternatively, both parties might assume that the other party is going to initiate the call, resulting in no re-establishment of the call.

The dropped call situation is worsened in the case of a connection between a mobile device and a network, for example between a user's mobile Web browser and the Internet. If a mobile Web browser is in communication with a server on the Internet, and the communication is dropped, the mobile Web browser must re-establish communication with the server and then the user must re-navigate through the Web site until reaching the location in the Web site when the communication was dropped. In addition, information that the mobile Web browser transferred to the server can be lost due to the unexpected, premature, loss of communication. This type of interruption is especially inconvenient when a user is mid-way through an electronic transaction because lengthy information, such as, credit card data or delivery address must be re-entered.

Therefore, there is a need for an improved method and apparatus for recovering from a loss of communications in telecommunication networks.

SUMMARY OF THE INVENTION

In accordance with the invention, during an exchange of communications between a client and a server over a computer network, the state of communications is monitored to determine if the client has lost communication with the server prior to completion of the exchange. If a loss of communication is detected, a recovery message is transmitted to the client, wherein the recovery message is received by the client after client communications with the network are re-established. In one aspect of the invention, the recovery message causes the client to send a response message to a predetermined network location that is specified in a Uniform Resource Locator (URL) embedded in the recovery message. Receipt of the response message is an indication that the client has re-established communication. In such a case, the exchange is returned to a state that existed prior to the loss of communication.

In accordance with another aspect of the invention, a recovery agent maintains a transaction between a client and a server that communicate over a computer network such that the client and server can complete a transaction that is prematurely interrupted due to a client communication failure. The recovery agent resides at a network location that has access to transaction-related communications between the client and the server, such as at the server itself or at some network location interposed between the client and the server.

Other features and advantages of the present invention should be apparent from the following description of the preferred embodiment, which illustrates, by way of example, principles of the invention.

DETAILED DESCRIPTION

Consumer demand for improved communication systems, in particular wireless communication systems, is continuing to expand. Currently, wireless communication systems are based on second generation wireless technologies, such as "Global Systems for Mobile communications" (GSM) as well as "Code Division Multiple Access" (CDMA) standards IS-95. Recent developments in wireless communication technologies have lead to the development of third generation (3G) standards, such as the "Universal Mobile Telecommunication System" (UMTS), CDMA2000, and wideband CDMA (WCDMA).

Figure 1:
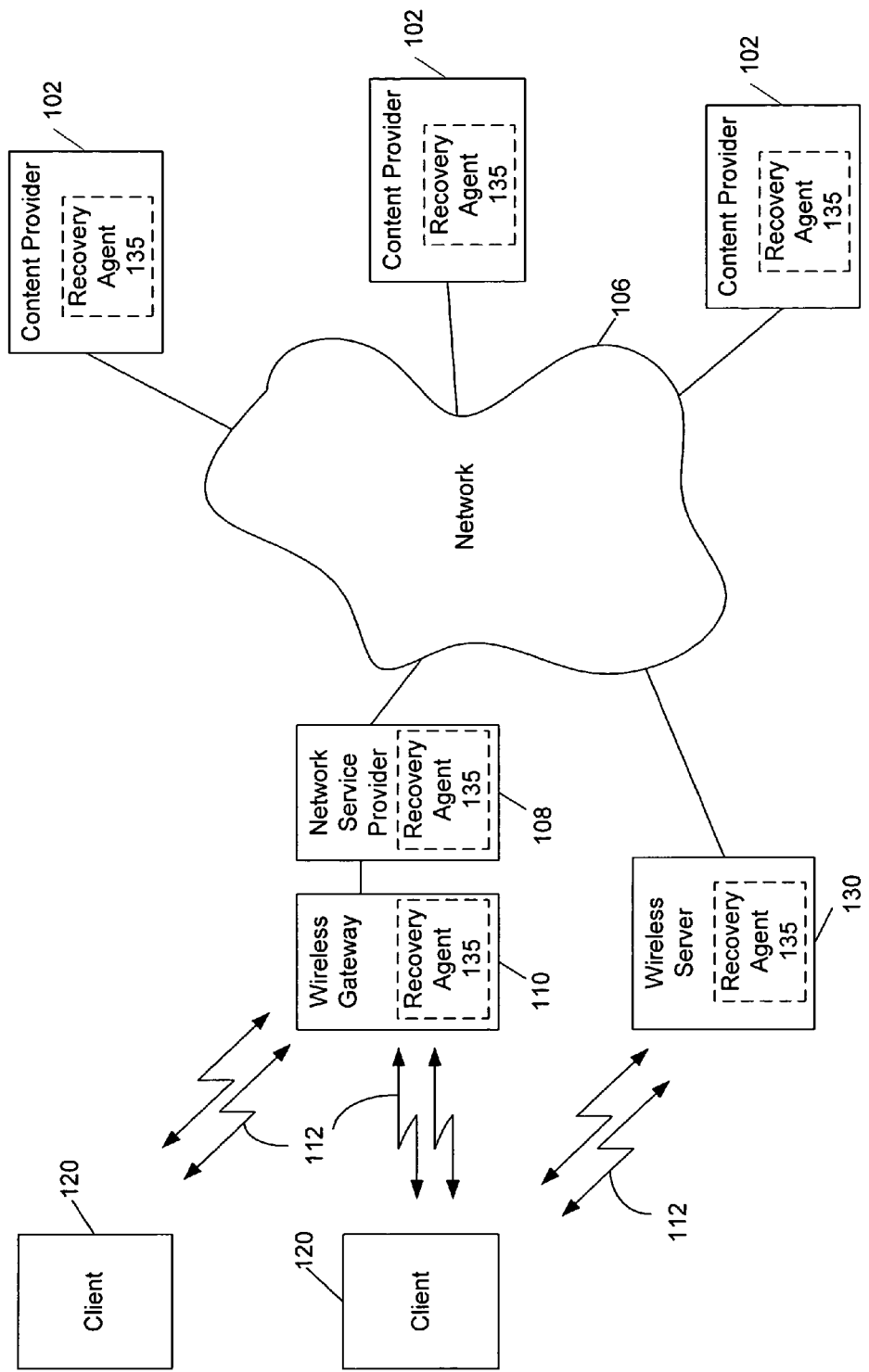
FIG. 1 is a block diagram of a wireless communication system providing a mobile user access to a network.

The improved broadband communications offered by the 3G communication systems provides the increased bandwidth to support many new wireless applications. For example, the increased bandwidth makes mobile access to networks, such as the Internet, practical. FIG. 1 is a block diagram of a wireless communication system providing a mobile user access to a network 106. In FIG. 1, content providers 102 are in communication with various servers and gateways via a network 106. The content providers 102 can comprise server computers that serve data, such as Web pages, over the network 106 in a well-known manner. The content providers 102 communicate with a network service provider 108 that facilitates interfacing with clients, or users, over the network 106. In one embodiment, the network service provider 108 is also in communication with a wireless gateway 110. The wireless gateway 110 is the interface between clients 120 and the network 106 via a wireless communication channel 112. In another embodiment, clients 120 interface to the network 106 and the content providers 102 via a wireless server 130. The wireless server 130 provides the interface to the network 106 as well as the interface to the client via the wireless communication channel 112. The wireless gateway 110, network service provider 108, wireless server 130, and content provider 102 are nodes of the network 106.

During an exchange of communications between a client 102 and a server of the content provider 120, the state of communications is monitored to determine if the client has lost communication with the server prior to completion of the exchange. If a loss of communication is detected, a recovery message is transmitted to the client such that the client receives the recovery message after client communications with the network are re-established. The recovery message causes the client to send a response message to a predetermined network location. Receipt of the response message is an indication that the client has re-established communication. In such a case, the exchange is returned to a state that existed prior to the loss of communication.

Many network communications are stateless, in the sense that requests for data are independent and are concluded upon sending a response. An example of this is a request for a Web page. The invention is especially suited for facilitating an exchange of communications in which at least two pages are associated with each other such that, under normal operations, the client will request a first page that begins the exchange of communications and will, eventually, request a subsequent page (such as a second page) that ends the exchange. Common examples of such communication exchanges are e-commerce transactions and registration procedures.

In one embodiment, a recovery agent 135 can be located at a location external to the client 120 and at a network location that provides access to communications between a client 120 and a content provider 102. In FIG. 1, the recovery agent 135 is represented by a dashed box within each of the gateway 110, service provider 108, wireless server 130, and content provider 102, which indicates that the recovery agent 135 can reside at any of these locations, although it does not necessarily reside at more than one of these locations. In accordance with one aspect of the invention, the recovery agent 135 implements processing to recover from prematurely interrupted exchanges of communication between a client 120 and a content provider 102 in order to reduce the inconvenience that a client 120 encounters when the communication is interrupted. The exchange of communication can comprise, for example, an e-commerce transaction.

During a typical exchange of communications, such as, for example, during an e-commerce transaction, the recovery agent 135 will monitor the state of the communications as the client processes the transaction. For example, the recovery agent 135 can keep track of the Web site, as well as the page in the Web site, where a client is located with respect to the transaction. In addition, the recovery agent 135 will preferably maintain a list of volatile data comprising data that will otherwise be lost if the transaction terminates prematurely. If the client transaction terminates prematurely, the recovery agent 135 will store the volatile data, so the client can be sent back to its last location in the network site, with no loss of data, once communications with the client are re-established. That is, the recovery agent 135 returns the transaction to the state at which it was prior to the loss of communication that caused the premature termination of the transaction.

Clients 120 can be different types of mobile devices. For example, the devices can include cellular phones, personal digital assistants (PDA), and wireless Web browsers. Clients 120 can also be other types of devices that will become available in the future. References to actions performed by clients will be understood to refer to actions initiated by a user at a client device, as required by the context.

In one embodiment, the network 106 is the Internet. In other embodiments, the network 106 can be other types of networks, for example, a company intranet, a company extranet, a local area network, a wireless network, or other type of network suitable for communications between electronic devices. The wireless communication channel 112 can comprise, for example, any of the 3G standards referred to above.

In a typical data communication or other transaction, a client 120 will establish communication with the network service provider 108 via the wireless gateway 110, or with the wireless server 130. After the client has established communication, the client will request information from one of the content providers 102 over the network 106. The network service provider 108, or wireless server 130, will locate the requested information and will provide the client 120 access to it. For example, a client 120 can request a particular Web page, which is specified by a uniform resource locator (URL). A URL is a reference to a resource (such as a Web page) located on a network. The URL for the Web page is sent to the network service provider 108 or wireless server 130. The network service provider 108, or wireless server 130, will locate the desired Web page at one of the content providers 102 and provide the client with access to the Web page. The client 120 will continue communicating with the content provider 102 over the network 106. If the exchange of communications involves a transaction, then the communication will involve requesting, receiving, and entering data as the client 120 continues the transaction. When the client 120 has completed the transaction, and no longer desires access to the content provider 102, the client 120 will terminate the communication with the network service provider 108 or wireless server 130.

A problem arises if the communications between the client 120 and the content provider 102 are prematurely interrupted, for example, if the wireless channel 112 is "dropped." In this scenario the client's communication with the content provider 102 is prematurely terminated while an exchange of communications is still in process.

The premature termination of the exchange of communications can result in several hardships for the client 120. For example, the client 120 will need to re-establish communication with the content provider 102 via the network service provider 108 or wireless server 130. Once communication is re-established, the client 120 will then have to re-navigate to the Web page location where the client was when the communication was lost. For example, many Web sites must be navigated through several layers of "nested" pages, and the client might have been several levels down into a particular Web site when communications were lost. The client 120 will need to re-navigate down to the level of the Web site at which it was previously located. In addition, information the client entered during the interrupted exchange might be lost. For example, if the client 120 was entering information into a form on a Web site when the exchange was interrupted, the client might need to re-enter the data again after the page with the form is re-located, or if the client was filling an on-line shopping cart then the contents of the cart might have been lost and the client will need to re-select the items for the shopping cart.

The recovery agent 135 advantageously utilizes wireless communication "push" technology to query the client 120 regarding whether the client 120 has re-established communication and to be automatically informed when client communication with the network is re-established. The recovery agent 135 notifies a "push initiator" that sends a push message to the client 120, eliminating the need for the client 120 to initiate the continuation of an interrupted exchange of communications. There are several "push" technologies currently available that are currently suitable for use with the invention, such as the technologies incorporated into the wireless application protocol (WAP) and handheld device markup language (HDML). The push technology described herein is with reference to WAP and HDML, although it should be appreciated that different types of push technology can be used pursuant to other protocols and languages.

Push technologies, such as those incorporated in WAP and HDML, are used in the preferred embodiment to support an asynchronous network interaction model. In a conventional synchronous network interaction model, a client actively requests information over the network and the information is provided in response to the request. In an asynchronous network model, a network device, such as a server, does not have to wait for a request from a client, instead the network device can send data that has been identified as being of interest to a client as the data becomes available. This is referred to as a "push". Conventional applications of push technologies include, for example, informing clients of timely and volatile information such as changes in stock prices, or weather updates.

In a conventional push, information is broadcast to selected clients without regard to a further exchange of communications. In contrast, the recovery agent 135 of the present invention detects conditions that indicate that there is a loss of communication between the client 120 and the network 106, specifically the content provider 102, and in response to a loss of communication, the recovery agent 135 communicates a specific recovery message to be pushed to the client 120. In response to receiving the recovery message, the client 120 sends a response message that is specified in the recovery message, thereby indicating to the recovery agent 135 that communications between the client 120 and the network 106 have been re-established. This can be accomplished, for example, by sending a push message to the client pursuant to the Push Access protocol of WAP, wherein the message contains a URL. A client 120 that receives the push message then sends a response to a predetermined location, such as the location specified by the URL contained in the push message. In one embodiment, the recovery agent 135 determines the state of communications prior to the push by monitoring at least a portion of the client's activity on the network and, upon re-establishment of communication between the client and the server, returns the communications to the monitored state that existed prior to the loss of communication.

The recovery agent 135 can operate at any one, or more, of several different locations within the network 106 such that the recovery agent 135 can monitor communications between the client 120 and the content providers 102. In one embodiment, the recovery agent 135 is located in the network service provider 108. As the client 120 navigates across the network 106, the recovery agent 135 will monitor the state of communications via the network service provider 108. In another embodiment, the recovery agent 135 can be located at a content provider 102. When a client performs a transaction with the content provider 102, the recovery agent 135 will monitor the state of communications, such as the state of a transaction taking place. In yet another embodiment, the recovery agent 135 can be located at the wireless gateway 110. The recovery agent 135 will monitor the state of communications as messages are passed between the client 120 and the network service provider 108. Although identified as independent units in FIG. 1, the network service provider 108 and the wireless gateway 110 can be incorporated into a single unit. In yet another alternative embodiment, the recovery agent 135 can be located in the wireless server 130.

Figure 2:
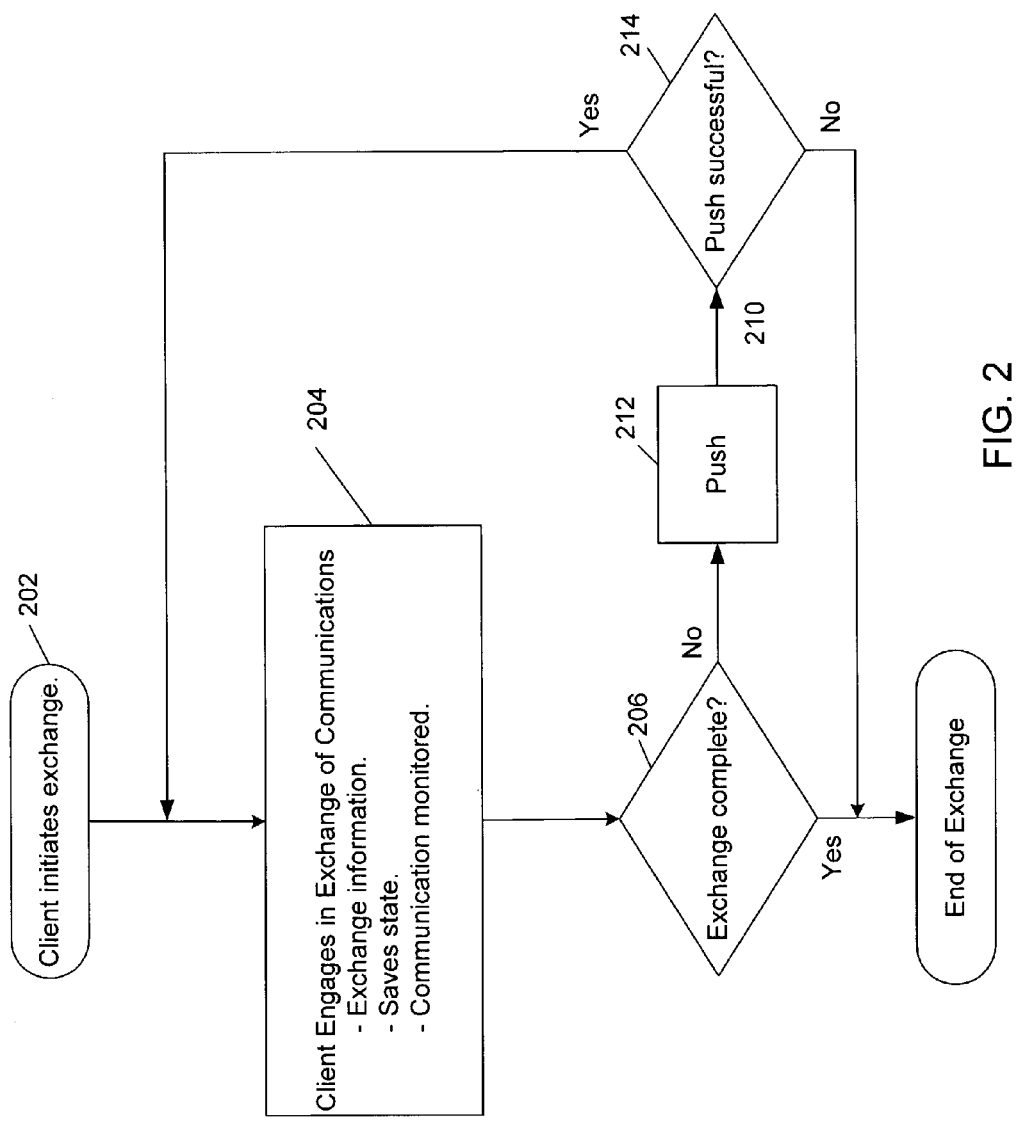
FIG. 2 is a flow diagram of a typical client transaction.

FIG. 2 is a flow chart of a typical exchange of communications involving a recovery agent 135 constructed in accordance with the present invention. In block 202, the client 120 initiates an exchange of communications that will involve the exchange of data between the client 120 and a content provider 102. For example, the client 120 can request a Web page that provides on-line shopping wherein the client 120 will provide data pursuant to the online shopping, as described below. Flow then continues to block 204. In block 204, the client engages in an exchange of communications, such as, for example, an e-commerce transaction, by providing data to the content provider 102, such as data relating to an online purchase. For example, the client can provide data that identifies one or more items for purchase, quantities of items, promotional codes, name and address information, credit card information, and other data that is related to the transaction. The exchange of communications need not be related to a purchase. For example, the client 120 can sign up for a membership or request information, which might require the client 120 to provide information to the content provider 102.

During the exchange of communications, the recovery agent 135 monitors the communications in relation to the exchange and saves state information regarding the exchange pursuant to the operation of block 204 in FIG. 2. In the preferred embodiment, the recovery agent 135 monitors the content of communications that are exchanged between the client 120 and the content provider 102. The recovery agent 135 can extract data contained in the communications, including data that reflects the state of an exchange such as a transaction. For example, if the transaction relates to the purchase of a product, the communications between the client and the content provider will include data (which can be specified by the client or the server) that indicates the details of the transaction, such as product numbers, quantities, and prices regarding the transaction. The recovery agent 135 extracts such data from communication messages and stores the data for later recovery.

The communications can involve forms and data for forms. In one embodiment, the recovery agent 135 knows how to examine the content of communications and obtains state information using internally-stored models that describe Web page configurations for particular content providers 102. The models indicate the Web pages that are associated with a particular exchange of communications, as well as the data expected to be provided by a client 120 that accesses the Web pages. When the client 120 accesses the Web pages for which a model is stored, the recovery agent 135 obtains the relevant state information relating to that Web page by either querying the content provider 102 or by extracting the information from the communications pursuant to the stored models. For example, the content provider can be an online book store that has a series of predetermined Web pages that the client accesses to engage in a transaction relating to the purchase of books. The recovery agent 135 can have a model associated with the book store Web pages, wherein the model describes the state information that is associated with the Web pages, such as the identification numbers of the Web pages, the data that is associated with each of the Web pages, and client ID and session ID for the Web pages being accessed. The recovery agent 135 can then reference the model when monitoring transactions that involve those Web pages.

With reference to FIG. 2, after the client 120 has engaged in the exchange of communications in block 204, flow then continues to block 206. In block 206, it is determined if the exchange is complete. The exchange is typically deemed complete when the client 120 accesses a particular Web page that ends the exchange, such as by accessing a page where a "submit" button can be selected. The client can successfully complete the desired exchange (a "Yes" outcome from block 206), resulting in flow continuing to block 210, ending the exchange of communications. If the exchange was not completed, a negative outcome at the decision block 206, then the flow continues to block 212. The exchange might not have been completed for many reasons, for example, the client might have lost communications with the network. The recovery agent 135 can determine that the client lost communications with the network if no communications are received from the client within a predetermined time period.

In block 212, a push operation is initiated in response to the loss of communication. As noted below, the push operation can be performed utilizing WAP or HDML type features or features pursuant to any other wireless protocol, as will be known to those skilled in the art. In accordance with the push operation, a communication comprising a recovery message that includes a URL is pushed to the client 120, preferably by the recovery agent. Upon the client's receipt of the recovery message, the client 120 will respond to the recovery message by sending a response message comprising a request for the pushed URL, preferably by sending the response message to the party that sent the recovery message. This occurs automatically as a feature of the WAP technology. Receipt of a client request for the URL by the recovery agent 135 indicates communication has been re-established with the client. In one embodiment, the pushed URL is a URL that specifies the network location of a Web page that includes the transaction's last state, prior to the loss of communications. In another embodiment, the URL corresponds to a predetermined Web site that can facilitate desired recovery procedures. In addition to containing the URL, the pushed recovery message can also contain a message asking if the client wants to continue the transaction.

Generally, the WAP or HDML push technology will repeatedly send the push message to the client until the message is acknowledged or until a predetermined amount of time has elapsed. Flow then continues to block 214. In block 214 it is determined if the push was successful. The push can be deemed successful, for example, because a response message was received from the client, such as where a request for the pushed URL was received from the client. If the push was successful, an affirmative outcome at the decision block 214, flow will return to block 204 and the client can continue with the exchange of communications. If the push is not successful, such as if the client does not respond to the push with a predetermined time period, or if the client indicates continuation is not desired (a "No" outcome), then flow will continue to block 210, ending the exchange.

Figure 3:
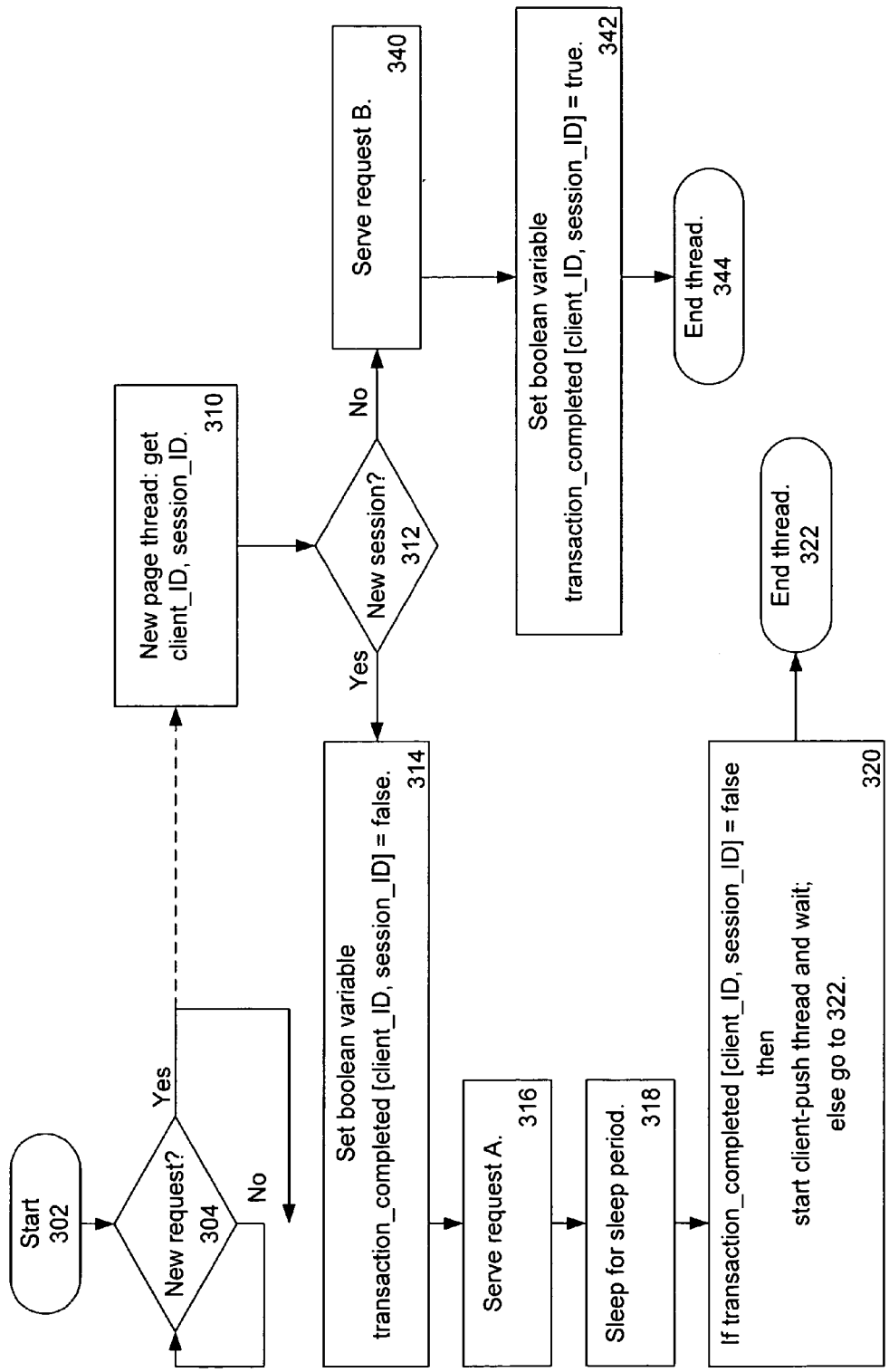
FIG. 3 is a flow diagram showing additional detail of one embodiment of determining if a client has lost communication with the network.

FIG. 3 is a flow chart showing additional detail of one embodiment of determining if a client 120 has lost communication with the network 106. Flow begins in block 302 at the device where the recovery agent 135 is located, such as at the content provider 102 or at some other network location that has access to communications from the client 120. Flow continues to block 304 where the recovery agent 135 determines if a client has made a new request for a Web page. The recovery agent 135 can do so by monitoring the content of client communications in a well-known manner. If there has been no new request, the flow remains in block 304 waiting for a new request from the client. If there is a new request from the client (a "Yes" outcome), a new page thread is started in block 310 and the recovery agent 135 waits for additional page requests from the client 120.

When a new page request occurs, flow in the new page thread begins in block 310, where the client ID and session ID are determined. The recovery agent 135 either assigns a new client ID and session ID if the page request relates to a new exchange of communications or obtains an existing client ID and session ID from internal records if the page request relates to an existing exchange of communications. The client ID is used to identify a particular client 120 and the session ID is used to identify a particular exchange of communications. Thus, for example, if the same client 120 accesses different Web sites pursuant to different transactions, the recovery agent 135 would assign a different session ID with each transaction and assign the same client ID to each transaction. The recovery agent 135 could assign the IDs itself or it could query the content provider for the IDs. The recovery agent 135 stores the client ID and the session ID in local memory.

Flow then continues to block 312. In block 312, the recovery agent 135 determines whether the page request is the beginning of a new session (i.e. a new exchange of communications) for the client. The recovery agent 135 deems that the page request is for a new session where the page being requested is an "entry level" page for an exchange according to the Web site's particular page configuration, such as a page where the client 120 initially enters items into a shopping cart.

FIG. 3 is described with respect to an example where an exchange of communications comprises a transaction having at least two pages that are associated with each other such that, under normal operations, the client will request a first page that begins the exchange and will, eventually, request a subsequent page (such as a second page) that ends the exchange. For example, the exchange of communications can comprise an e-commerce transaction involving online shopping where a client requests a URL, "Page A", that includes a shopping cart containing items that the client wants to purchase. The request of Page A indicates the beginning of a new session or transaction. In the case of an e-commerce transaction, when the client has added all the desired items to the shopping cart, the client requests a URL for a specific page, "Page B", such as a URL to "submit" the client's order. The request of Page B indicates the end of the session that originated with the request of Page A. Thus, the designer of the Web site will define the circumstances under which a new session is indicated and the conditions under which a session ends. As mentioned above, the recovery agent 135 can be programmed with models that provide the recovery agent 135 with knowledge of the conditions under which transactions begin and end for particular Web sites, as well as the data content to be expected.

If in block 312 it is determined that the request is the start of a new session, an affirmative outcome, then the flow continues to block 314. In block 314 the recovery agent sets to "false" a Boolean variable "transaction_completed" that is associated with the client ID and session ID. This is used as an indication to the recovery agent 135 that the exchange associated with the particular client ID and session ID is still pending and has not yet been completed.

Flow then continues to block 316 and the requested information, Page A, is served to the client by the content provider 102. After Page A is served, the page thread suspends activity, or "sleeps" at block 318, for a sleep period comprising a predetermined amount of time. The sleep period is selected to provide the client 120 with sufficient time to complete the transaction. Thus, the amount of time in the sleep period can vary based on the particular Web site. The sleep period can be longer for Web sites that require the client 120 to provide a greater amount of information than other sites. In one embodiment, the sleep period is about 5 minutes (300 seconds), although it can be any other desired time period consistent with normal operation. Following the sleep period, the page thread resumes activity and flow continues to block 320.

In block 320, the recovery agent 135 checks the status of the "transaction_completed" Boolean variable for the client ID/session ID. If the "transaction_completed" Boolean variable is "false", then this indicates to the recovery agent 135 that the transaction associated with the client ID/session ID has not been completed, as the client has not yet requested Page B in the expected time for normal operation. This means that the client 120 has probably lost communications with the network 102. In response, the recovery agent 135 initiates a client push thread and waits for communications to be re-established (the push thread process is described further below with reference to FIG. 6). If communications are never re-established, then the recovery agent 135 can store the monitored state of the transaction for a time period determined by the recovery agent 135 and then can delete the stored state.

If the "transaction_completed" Boolean variable is "true", then this indicates to the recovery agent that the transaction was completed during the "sleep" period, such as a result of the client requesting Page B. In such a case, no push thread is initiated. Flow then continues to block 322, where the thread ends.

If the "transaction_completed" Boolean variable had been found to be "true" at block 320, then this would indicate that the transaction associated with the client ID and the session ID had been completed during the sleep period of block 318, such as if a request for Page B had been received. If this had occurred, then in block 304 a new page request for Page B would have been received during the sleep interval, which indicates that there was no interruption in communications for the client 120. In such a case, an additional new thread would have begun at block 310 (for Page B) and the recovery agent 135 would have obtained the client ID and session ID in connection with the request for page B. Flow would then have continued to block 312. In block 312, the recovery agent would have determined that the request for Page B was not associated with a new session (a "No" outcome) because the client ID/session ID pair for page B would already exist in the recovery agent's records.

Flow would then continue to block 340. In block 340, the content provider 120 would serve the requested information, Page B, to the client. Flow would then have continued to block 342. In block 342, the recovery agent 135 would have set the "transaction_completed" Boolean variable to "true", indicating that the transaction for the client ID/session ID was completed, such as where Page B was requested by the client 120 or where the client 120 initiated some other action associated with Page A in accordance with Web site processing. Flow would then continue to block 344, where the second thread ends. As described above, the first thread would then have awakened from the sleep period and found the transaction_completed flag to be set to true. Thus, in this scenario, the client requested Page B before the first thread ended its "sleep" period, and therefore, when the first thread checked the status of the "transaction_completed" Boolean variable, it found the Boolean variable to be true and the recovery agent 135 would have ended the first thread.

Generally, for a given pair of client IDs and session IDs, the "transaction_completed" Boolean variable will be reset to "false" every time a new page is requested in connection with the same transaction after the initial request for Page A. Upon a new page request, the sleep period is also reset to zero, as the page request is an indication that the client 120 has not lost communication with the network 106. For example, a request for the same page (a refresh operation) or a request for a page other than Page A or Page B that is part of the present transaction will result in reset of the variable to "false" and a reset to the start of the sleep period. Other client actions or page requests can be associated with Page A to reset the Boolean variable, as desired. In this way, the recovery agent 135 determines if network communication with the client 120 has been lost.

Figure 4:
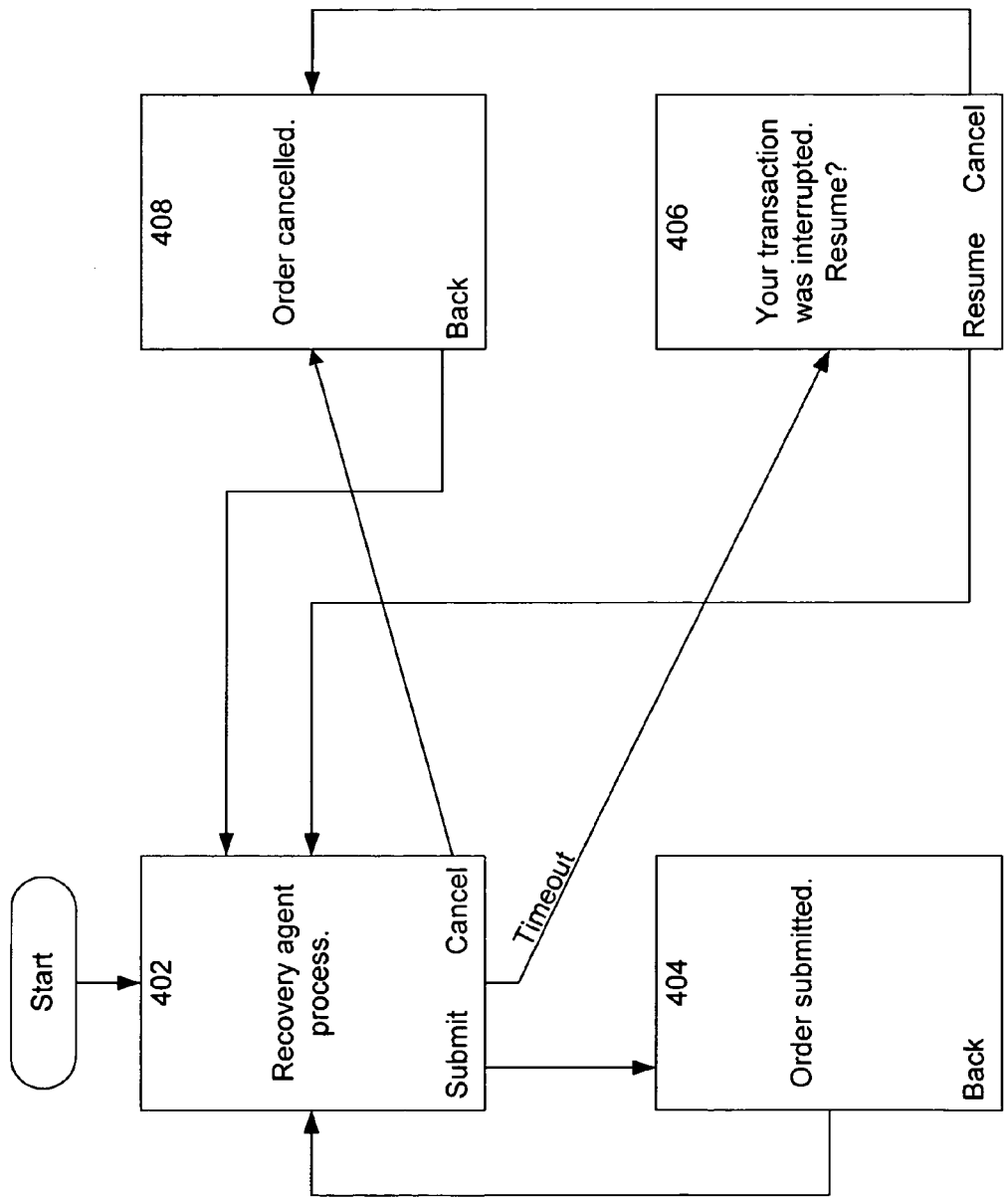
FIG. 4 is a flow diagram illustrating an embodiment of determining if a client has lost communication with the network.

FIG. 4 is a flow diagram illustrating an example of the processes associated with determining if a client has lost communication with the network. In block 402, a request from a client 120 is received by a content provider 102, indicating that the client 120 is engaging in an exchange of communications, for example, considering a transaction, such as to purchase an item. For example, the request could include a list of items, such as shares of stock, listed on a retailer's Web site, corresponding to Page A. At this stage, the client 120 has provided the content provider with information relating to the transaction, but has not yet finalized the transaction. As mentioned, the recovery agent 135 resides at some network location that has access to the client request and, therefore, can obtain state information regarding the transaction.

In block 404, the client request is submitted, such as to a third party, and processing returns to block 402 for the sleep period. The recovery agent 135 then monitors the client's activity to determine if an additional request is sent by the client, for example a request to finalize the transaction corresponding to Page B. If there is no additional request from the client within a predetermined amount of time, this is an indication that communication with the client was interrupted and flow continues to block 406 as a result of a timeout. In block 406, the recovery agent 135 sends the client 120 one or more push messages (or causes one or more push messages to be sent to the client). When communications are re-established, the client receives the message informing it that the transaction was interrupted and inquiring if the client wishes to resume the transaction or cancel the transaction. If the client 120 indicates that it wishes to resume its transaction, flow returns to block 402 and the transaction continues. In block 406, if the client 120 indicates that it wishes to cancel its transaction, flow continues to block 408 and the transaction is cancelled. For example, the client's order can be cancelled. Processing then returns to block 402. The client can send a request to cancel the transaction at any time from block 402, and in that situation flow will continue to block 408 and the client's transaction will be cancelled.

Figure 5:
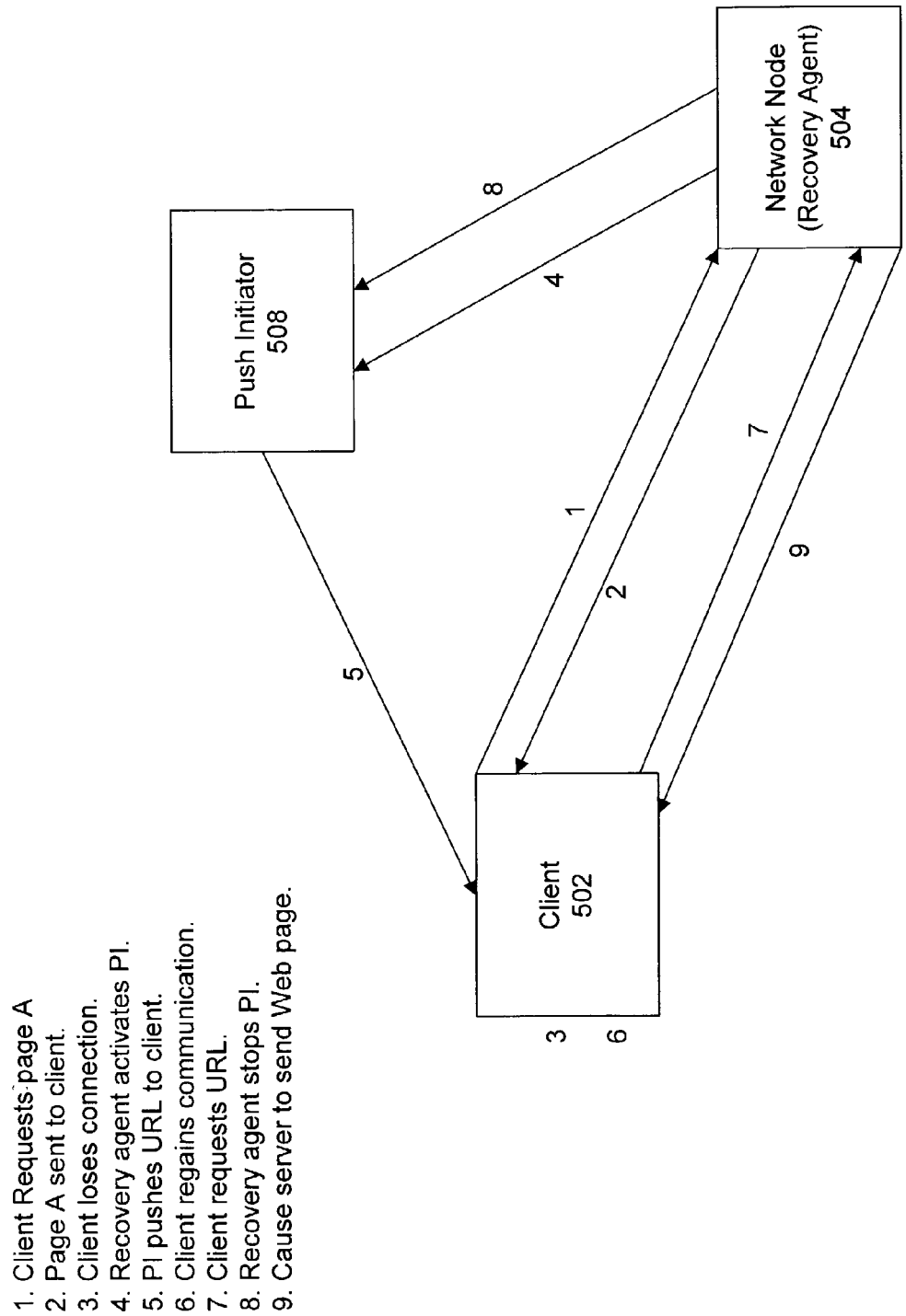
FIG. 5 is a block diagram of an embodiment of a push operation in accordance with the invention to implement the recovery agent.

FIG. 5 is a block diagram of an embodiment of a push operation in accordance with the invention to implement the recovery agent 135. A client 502 sends a request to a network node 504 comprising a recovery agent, such as a server or gateway or content provider with processing in accordance with the invention (arrow segment 1 in FIG. 5). For example, the request could be for a first page, Page A, of a transaction such that under normal operations the client will eventually request a subsequent, second page, Page B, during the transaction. The recovery agent 504 receives the initial request and also causes the requested page, Page A, to be sent to the client 502 (arrow segment 2) in a well-known manner. For purposes of this example, suppose that the client 502 then loses communication with the recovery agent (segment 3). After determining that the client has lost communication with the recovery agent, for example, because the client did not request a second page (e.g., Page B) within a predetermined amount of time, the recovery agent 504 activates a Push Initiator (PI) 508 (arrow segment 4). The PI 508 preferably resides at the same location as the recovery agent 504, although FIG. 5 shows the PI as a separate block that can be located anywhere in the network external to the client 502. The PI 508 "pushes" a recovery message to the client 120, which recovery message specifies a URL (arrow segment 5). In one embodiment, the PI 508 will push the recovery message to the client at a desired rate and for a desired length of time.

If the client 502 re-establishes communication at segment 6, the client 502 will receive a recovery message "pushed" by the PI 508. The client 502 will then respond to the recovery message. For example, the recovery message can include a URL, and the client, upon receiving the URL from the PI 508, will request a Web page specified by the "pushed" URL via the recovery agent 504 (arrow segment 7). The URL can specify a page located at the same location as the recovery agent, which would cause the client to send the response message to the recovery agent. The URL can alternately specify a page located at a different location from the recovery agent, such that the client would send a response message to the location specified in the URL and to the recovery agent. When the recovery agent 504 receives the response message that includes the request for the "pushed" URL from the client, the recovery agent 504 knows that the client 502 has re-established communication. The recovery agent 504 then stops the PI 508 from sending any additional recovery messages (segment 8). The recovery agent 504 then instructs the appropriate server to serve the Web page referenced in the URL to the client 120 and the transaction continues.

Figure 6:
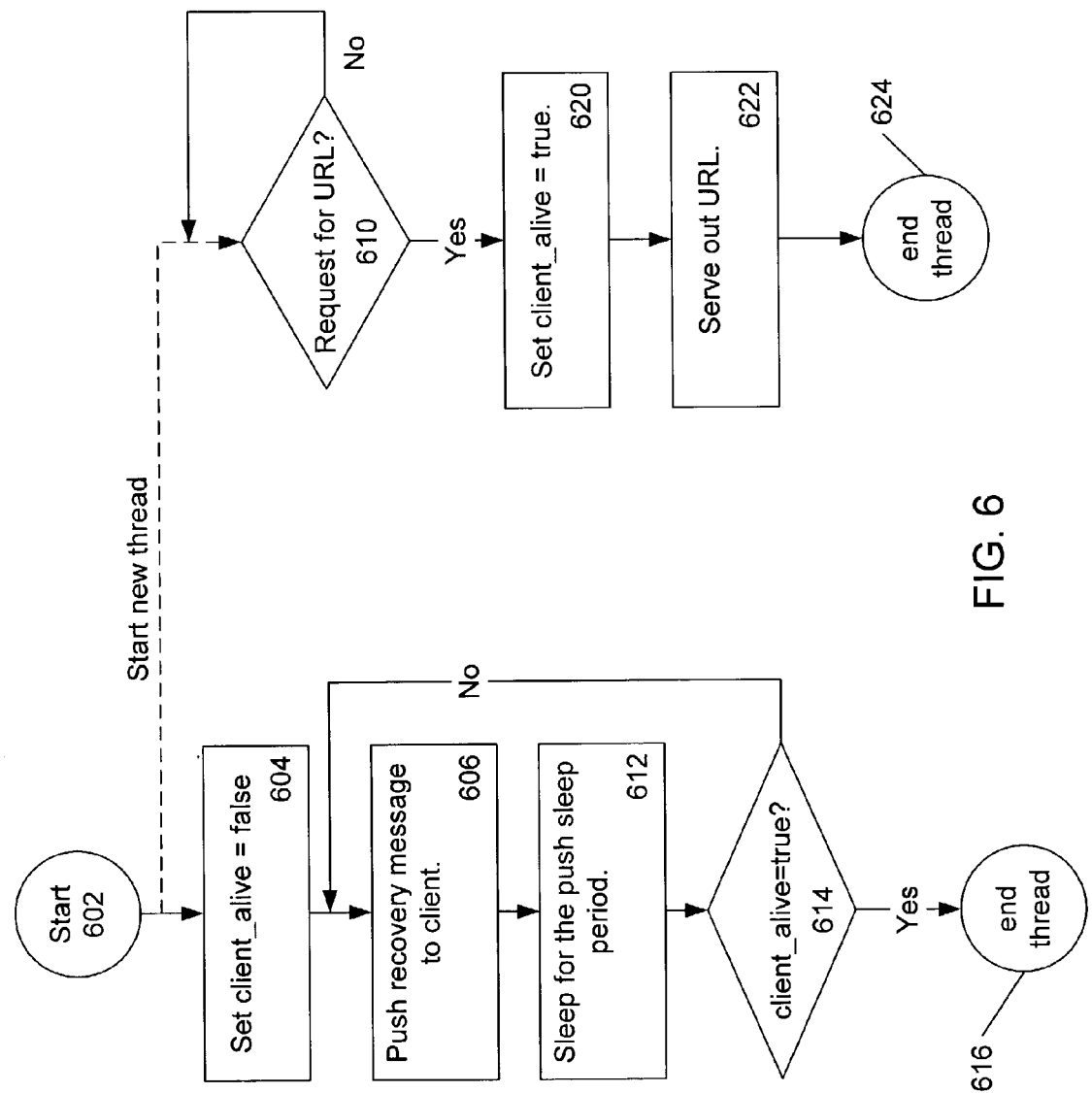
FIG. 6 is a flow diagram showing additional detail of one embodiment of a push operation.

FIG. 6 is a flow chart showing details of one embodiment of a push operation in accordance with the invention to implement the recovery of an interrupted transaction. Flow begins in block 602 where the recovery agent starts a first push thread when, for example, a client has not completed a transaction within a predetermined amount of sleep time, as described above with reference to FIG. 3. In addition, the recovery agent 135 starts a second push thread at block 610. Flow for the first push thread then continues to block 604. In block 604, a Boolean variable "client_alive" is set to "false", indicating that communication with the client has been lost. The recovery agent 135 can refer to the status of the Boolean variable client_alive to determine whether the client has lost communication.

The flow then continues to block 606. In block 606, the recovery agent 135 pushes a recovery message to the client. In one embodiment, when the client receives a "pushed" recovery message, the client will request a Web page. For example, if the recovery message includes a URL, then the client will send a request for a Web page corresponding to that URL to the recovery agent 135. The client preferably sends the request to the recovery agent, which then forwards the request to the network location that can provide the Web page referenced by the URL. Alternately, the client can send the request to a party other than the recovery agent and also send a verification message to the recovery agent. Thus, a request for a "pushed" URL indicates that communication with the client was lost but has been re-established.

Flow then continues to block 612 and the first push thread "sleeps", or suspends operation for a predetermined push sleep period, such as for a predetermined number of seconds. The push sleep period is intended to provide the client 120 with sufficient time to respond to the first pushed recovery message before another recovery message is sent. The amount of time in the push sleep period can vary so as to provide sufficient time for the client 120 to respond.

After the predetermined period has expired the thread will resume operation and flow will continue to block 614. In block 614, the recovery agent 135 examines the status of the Boolean variable "client_alive". If the Boolean variable "client_alive" is "true" (a "Yes" outcome from block 614), then this indicates to the recovery agent 135 that the client has requested the page associated with the pushed URL, which means that communications were re-established. Flow will then continue to block 616, where the thread will end. If it is determined in block 614 that the Boolean variable "client_alive" is "false" (a "No" outcome), then this indicates that the client has not responded to the pushed recovery message within the push sleep time period and that communications have not yet been re-established. Flow will continue back to block 606 and the desired URL will be pushed again. The Boolean variable "client_alive" will be set to true if, as described below, the client responds to the "pushed" recovery message.

The second thread of the recovery agent 135 flow begins in block 610. In block 610 it is determined if the client has responded to the recovery message by requesting the URL specified in the pushed recovery message. For example, if the recovery message includes a URL and the client has not requested the "pushed" URL, a negative outcome at block 610, then flow of the second thread remains in a wait condition at block 610. If the client has requested the "pushed" URL, an affirmative outcome at block 610, this indicates that communication with the client has been re-established. The client requests the pushed URL by sending a response message to the recovery agent, which then forwards the request to the network location specified in the URL. The recovery agent can thereby verify that communications have been re-established as evidenced by receipt of the response message from the client.

Flow then continues to block 620. In block 620, the recovery agent sets the Boolean variable "client_alive" to "true", which indicates that the client has re-established communication. Flow then continues to block 622 and the recovery page requested by the URL is served to the client in a well-known manner. Flow then continues to block 624 and the second thread ends.

In one embodiment, the "push" operation (block 606) sends a push message to the client with the address of the Web server at the content provider, so when the client re-establishes communication, it receives the pushed recovery message and the client's browser will access the server with a predetermined URL, i.e., make a page request to the server. The requested page can include a message, such as, "Do you want to resume?" or any other desired message. In this embodiment, the client sends the response message with the pushed URL to the recovery agent, which then requests the Web page associated with the URL on behalf of the client.

In another embodiment, the "push" operation could send a message with the address of another server so that the server receiving the response message from the client is at a different location from the location of the recovery agent or the content provider with which the client was engaging in the exchange of communications. In this case, the client sends a verification to the recovery agent that communications are re-established. The push operation can include continually pushing the predetermined page by the recovery agent until the URL request is received from the client, or it can include pushing the page once from the recovery agent to the gateway, which then continually pushes, and then repeatedly sending a query to the gateway asking if the push had been delivered and received by the client.

The flow chart illustrated in FIG. 6 can be set to work with specific Web pages, such as e-commerce transactions where a first page, Page A, is eventually followed by a second page request, Page B during normal operation, and it is desired to ensure that the client can get to Page B even if the client communications are prematurely interrupted between requests for Page A and Page B. As mentioned, the recovery agent 135 can be equipped with models that contain information regarding the configuration of the various Web pages on a Web site.

Figure 7:
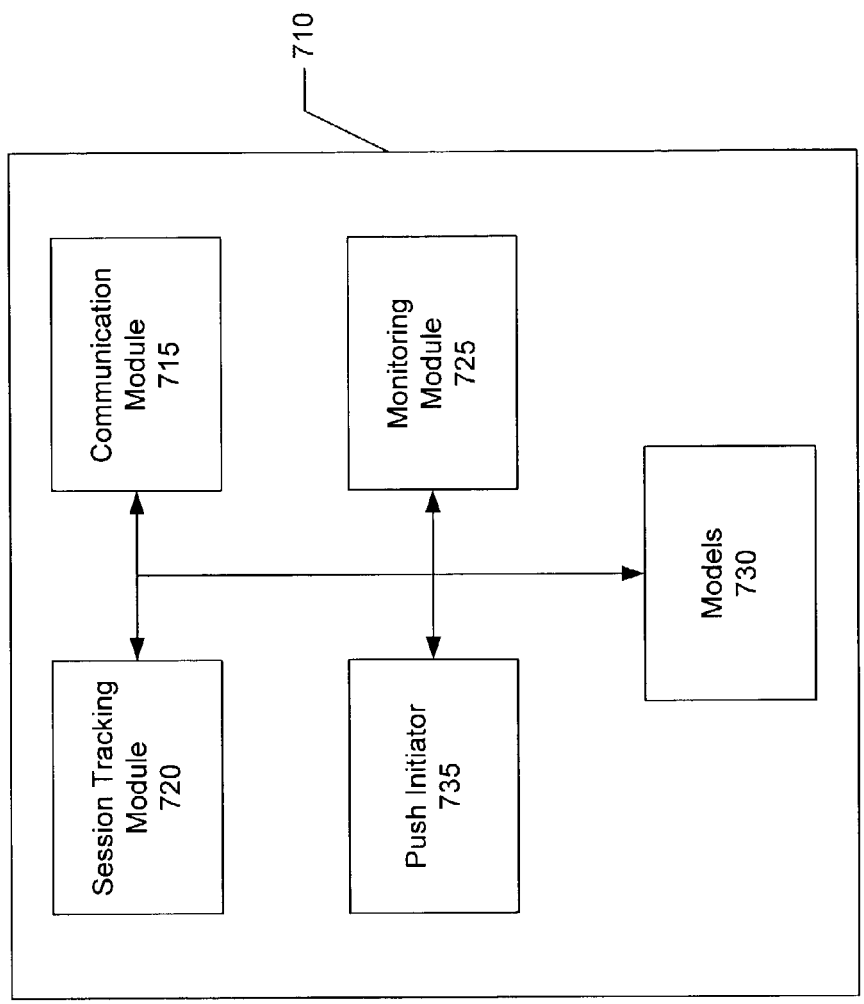
FIG. 7 is a schematic block diagram showing an exemplary arrangement of various modules for a recovery agent processor that performs the various processes described herein.

FIG. 7 is a schematic block diagram showing an exemplary arrangement of various modules for a recovery agent processor 710 that performs the various processes described herein. The modules can comprise, for example, program instructions that are executed by the processor. The processor 710 includes a communication module 715 that enables network communication over a network connection. The communication module 715 can receive communications that are exchanged between a client and content provider server. The processor further includes a session tracking module 720 that keeps track of client IDs and session IDs for currently pending transactions. The session tracking module 720 can store the client IDs and session IDs in local memory.

A monitoring module 725 interfaces with the communication module 715 to monitor and examine communications between client and servers. The monitoring module 725 can monitor for the presence of communications from the client 120 and determine, based on the presence or absence of communications, that the client has lost communication with the network thereby prematurely interrupting the transaction. The monitoring module 725 can also examine the communications to determine whether the communications relate to the request of certain Web pages, such as by examining the content of Hypertext Transfer Protocol (HTTP) communications in a well-known manner or by examining the contents of Hypertext Markup Language (HTML) documents that are contained in communications. The processor 710 can also include models 730 that contain information that is descriptive of Web site configurations for servers that are in communication with the processor 710. The models 730 provide the monitoring module with information that is used to identify certain Web pages and the data that is associated with the Web pages.

The processor 710 also includes a push initiator 735 that pushes recovery messages to the client 120 when the monitoring module 725 determines that communications with the client 120 have been interrupted.

The processor 710 resides at a network location that is external to the client 120. The processor 710 can be incorporated in a server computer of a content provider or it could be located at some intermediate network location between a content provider and the client. It should be appreciated that the schematic diagram shown in FIG. 7 is exemplary and that the recovery agent 135 can have other architectures.

Figure 8:
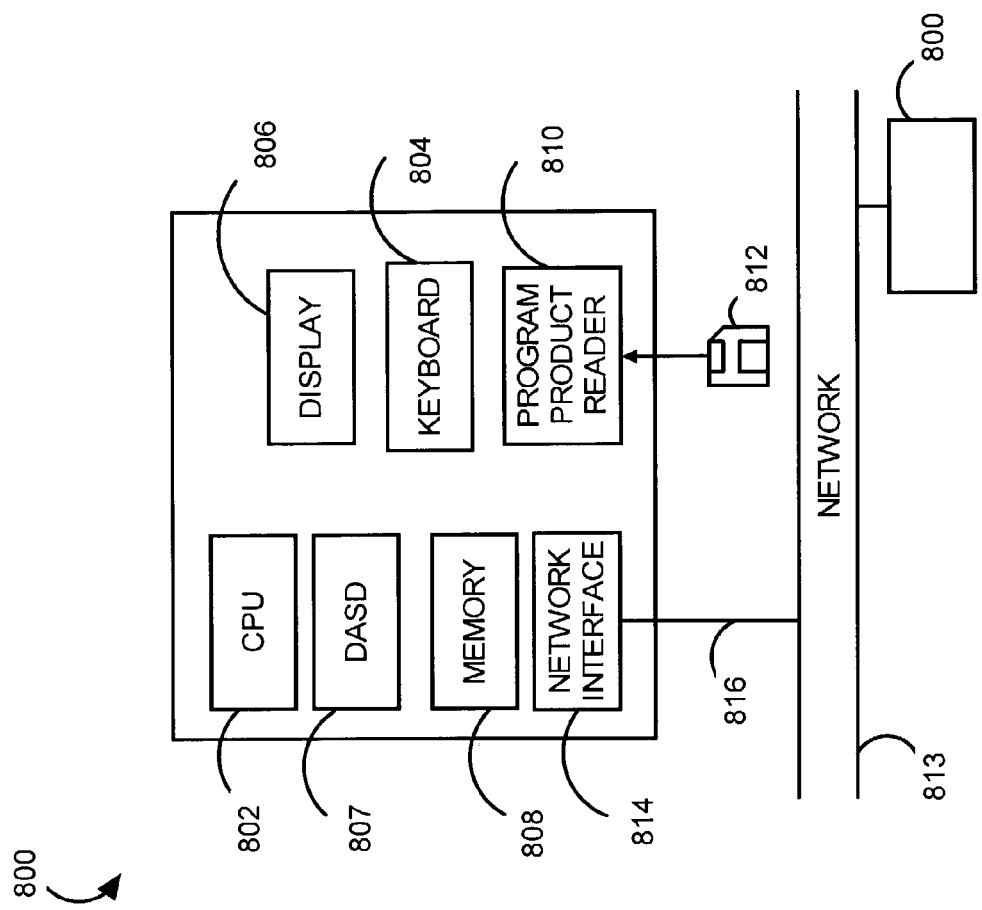
FIG. 8 is a block diagram of an exemplary computer such as might be used to implement high availability communication for wireless networks.

FIG. 8 is a block diagram of an exemplary computer 800 such as might be used to implement the processes of the recovery agent 135 described above. The computer 800 operates under control of a central processor unit (CPU) 802, such as a "Pentium" microprocessor and associated integrated circuit chips, available from Intel Corporation of Santa Clara, Calif., USA. A computer user can input commands and data from a keyboard 804 and can view inputs and computer output at a display 806. The display is typically a video monitor or flat panel display. The computer 800 also includes a direct access storage device (DASD) 807, such as a hard disk drive. The memory 808 typically comprises volatile semiconductor random access memory (RAM) and can include read-only memory (ROM). The computer preferably includes a program product reader 810 that accepts a program product storage device 812, from which the program product reader can read data (and to which it can optionally write data). The program product reader can comprise, for example, a disk drive, and the program product storage device can comprise removable storage media such as a magnetic floppy disk, a CD-R disc, or a CD-RW disc. The computer 800 can communicate with other computers over the network 813 through a network interface 814 that enables communication over a connection 816 between the network and the computer.

The CPU 802 operates under control of programming steps that are temporarily stored in the memory 808 of the computer 800. The programming steps can include a software program, such as a program that implements the recovery agent 135 and the various processes described herein. Alternatively, the software program can include an applet or a Web browser plug-in. The programming steps can be received from ROM, the DASD 807, through the program product storage device 812, or through the network connection 816. The storage drive 810 can receive a program product 812, read programming steps recorded thereon, and transfer the programming steps into the memory 808 for execution by the CPU 802. As noted above, the program product storage device can include any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 808 over the network 813. In the network method, the computer receives data including program steps into the memory 808 through the network interface 814 after network communication has been established over the network connection 816 by well-known methods that will be understood by those skilled in the art without further explanation. The program steps are then executed by the CPU.

The foregoing description details certain embodiments of the invention. It will be appreciated, however, that no matter how detailed the foregoing appears, the invention can be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

We claim:

1. A method of maintaining an exchange of communications between a client and a server communicating over a computer network, comprising:
   monitoring at an external network location the exchange of communications between the client and the server;
   determining at said location that the client has lost communication with the server prior to completion of the exchange of communications; and
   responding to the loss of communication by transmitting from said location a recovery message to be pushed to the client, receipt of the recovery message by the client will cause the client to send a response message to a predetermined network location.

2. A method as defined in claim 1, additionally comprising:
   upon receipt of the response message from the client, determining that the client has re-established communication and thereafter returning the exchange of communications to a state that existed prior to the loss of communication.

3. A method as defined in claim 1, wherein the recovery message comprises a push message that conforms to the Wireless Access Protocol.

4. A method as defined in claim 1, additionally comprising re-transmitting the recovery message to the client if the response message is not received from the client within a predetermined time period after transmitting the recovery message.

5. A method as defined in claim 1, wherein the response message comprises a request for a Web page.

6. A method as defined in claim 1, wherein the recovery message includes a uniform resource locator that specifies the predetermined network location to which the client will send the response message.

7. A method as defined in claim 1, wherein the exchange of communications involves a first Web page that the client accesses to begin the exchange of communications and a subsequent Web page that the client accesses to complete the exchange of communications, and wherein it is determined that the client has lost communication with the server prior to completion of the exchange of communications when the client has failed to request the subsequent Web page within a predetermined time period following the client's request for the first Web page.

8. A method as defined in claim 7, additionally comprising: consulting a model that describes the first Web page and the subsequent Web page and that indicates the data expected to be provided by the client in connection with the Web pages.

9. A method of recovering from a loss of communication between a client and a server that are engaging in an exchange of communications over a computer network, comprising:
   the client sending a request over the network for a first Web page that begins the exchange of communications;
   the client losing communication with the network;
   the client receiving a recovery pushed message over the network, thereby indicating that communication with the network has been re-established; and
   the client sending a response message to a predetermined network location in response to receipt of the recovery message to thereby verify that the client has re-established communication with the network.

10. A method as defined in claim 9, wherein the response message comprises a request for a Web page.

11. A method as defined in claim 9, wherein the recovery message includes a uniform resource locator (URL), and wherein sending the response message comprises sending the response message to a network location specified in the URL.

12. A processor for maintaining an exchange of communications between a client and a server communicating over a computer network, the processor comprising:
   a communication module that provides access to communications between the server and the client over the network;
   a monitoring module that monitors the exchange of communications between the client and the server, wherein the monitoring module can detect when the exchange of communications has been prematurely interrupted;
   a push initiator module that transmits a recovery message to the client when it is determined that the exchange of communications has been prematurely interrupted, receipt of the recovery message by the client will cause the client to send a response message to a predetermined network location.

13. A processor as defined in claim 12, wherein the monitoring module affirmatively detects that an exchange of communications has been interrupted when no communications regarding the exchange of communications have been detected from the client within a predetermined time period.

14. A processor as defined in claim 12, wherein the monitoring module monitors the exchange of communications between the client and the server by monitoring for communications relating to Web pages that relate to the exchange of communications.

15. A processor as defined in claim 14, wherein the monitoring module monitors for a communication relating to a Web page that begin the exchange of communications.

16. A processor as defined in claim 14, wherein the monitoring module monitors for a communication relating to a Web page that complete the exchange of communications.

17. A processor as defined in claim 12, wherein the push initiator module re-transmits the recovery message to the client when a response message is not received from the client within a predetermined time period of when the recovery message was first sent.

18. A processor as defined in claim 12, wherein the processor resides at the server.

19. A processor as defined in claim 12, wherein the processor resides at a network location that is interposed between the server and the client and that is external to the client.

20. A system for maintaining an exchange of communications between a client and a server communicating over a computer network, the system comprising:
   a memory in which instructions and data are stored;
   a processor, coupled to the memory, such that the processor receives the instructions stored in the memory and executes the instructions to perform operations comprising:
   monitoring the exchange of communications between the client and the server;
   determining that the client has lost communication with the server prior to completion of the exchange of communications;
   responding to the loss of communication by transmitting a recovery pushed message to the client, receipt of the recovery message by the client will cause the client to send a response message to a predetermined network location.

21. A program product for use in a computer that executes program steps recorded in a computer-readable media to perform a method of maintaining an exchange of communications between a client and a server communicating over a computer network, the program product comprising:
   a recordable media;
   a plurality of computer-readable instructions executable by the computer to perform a method comprising:
   monitoring the exchange of communications between the client and the server;
   determining that the client has lost communication with the server prior to completion of the exchange of communications;
   responding to the loss of communication by transmitting a recovery pushed message to the client, receipt of the recovery message by the client will cause the client to send a response message to a predetermined network location.

22. A method of processing an electronic exchange of communications on a computer network, the method comprising:
   receiving a request from a client for a first network page, wherein the first network page is used to begin the electronic exchange of communications;
   associating a predetermined second network page with the first network page, if a request for the second network page is not received from the client within a predetermined sleep time period of receiving the request for the first network page, a recovery message is transmitted to the client; and
   receiving a response message that is sent by the client upon the client's receipt of the recovery message.

23. A method as defined in claim 22, wherein the network comprises the Internet.

24. A method as defined in claim 22, wherein the network comprises a wireless communication channel.

25. A method as defined in claim 22, additionally comprising re-transmitting the recovery message to the client if a response message is not received from the client within a predetermined push time period of when the recovery message was first transmitted.

26. A method as defined in claim 22, wherein the recovery message is a push message the conforms to the Wireless Access Protocol.

27. A method as defined in claim 22, additionally comprising, upon receipt of the response message, returning the exchange of communications to a state that existed prior to the transmission of the recovery message.

28. A system for processing an electronic exchange of communications on a computer network, the system comprising:
   a memory in which instructions and data are stored;
   a processor, coupled to the memory, such that the processor receives the instructions stored in the memory and executes the instructions to perform operations comprising:
   receiving a request from a client for a first network page, wherein the first network page is used to begin the electronic exchange of communications;
   associating a predetermined second network page with the first network page, if a request for the second network page is not received from the client within a predetermined sleep time period of receiving the request for the first network page, a recovery message is transmitted to the client; and receiving a response message that is sent by the client upon the client's receipt of the recovery message.

29. A program product for use in a computer that executes program steps recorded in a computer-readable media to perform a method of processing an electronic exchange of communications on a computer network, the program product comprising:

a recordable media;

a plurality of computer-readable instructions executable by the computer to perform a method comprising:

receiving a request from a client for a first network page, wherein the first network page is used to begin the electronic exchange of communications;

associating a predetermined second network page with the first network page, if a request for the second network page is not received from the client within a predetermined sleep time period of receiving the request for the first network page, a recovery message is transmitted to the client; and receiving a response message that is sent by the client upon the client's receipt of the recovery message.

* * * * *